United States Patent
Byron et al.

(10) Patent No.: US 10,628,472 B2
(45) Date of Patent: *Apr. 21, 2020

(54) ANSWERING QUESTIONS VIA A PERSONA-BASED NATURAL LANGUAGE PROCESSING (NLP) SYSTEM

(71) Applicant: International Business Machines Corporation, Armonk, NY (US)

(72) Inventors: Donna K. Byron, Petersham, MA (US); Alexander Pikovsky, Lexington, MA (US); David G. Radley, Eastleigh (GB); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 15/659,812

(22) Filed: Jul. 26, 2017

(65) Prior Publication Data

US 2017/0323011 A1    Nov. 9, 2017

Related U.S. Application Data

(63) Continuation of application No. 14/539,268, filed on Nov. 12, 2014, now Pat. No. 9,721,004.

(51) Int. Cl.
*G06F 16/33* (2019.01)
*G06F 16/332* (2019.01)
(Continued)

(52) U.S. Cl.
CPC ........ *G06F 16/3344* (2019.01); *G06F 16/334* (2019.01); *G06F 16/338* (2019.01); *G06F 16/3329* (2019.01); *G06F 16/9535* (2019.01)

(58) Field of Classification Search
CPC .................. G06F 16/3329; G06F 16/3344
See application file for complete search history.

(56) References Cited

U.S. PATENT DOCUMENTS 6,466,213 B2    10/2002  Bickmore et al.
7,657,425 B2     2/2010  Ejerhed et al.
(Continued)

FOREIGN PATENT DOCUMENTS

EP    1793318 A2    6/2007

OTHER PUBLICATIONS

List of IBM Patents or Patent Applications Treated as Related, Jul. 26, 2017, 2 pages.

(Continued)

*Primary Examiner* — Kris E Mackes
(74) *Attorney, Agent, or Firm* — Stephen J. Walder, Jr.; Reza Sarbakhsh

(57) ABSTRACT

A mechanism is provided, in a question answering (QA) system, for performing persona-based question answering is provided. An identification of a requested persona is received from a user along with a natural language question input specifying an input question to be answered by the QA system. Responsive to receiving the requested persona, components of the QA system are customized to answer questions from a viewpoint of the requested persona. An answer to the input question is generated from the viewpoint of the requested persona based on the customization of the components of the QA system. The answer to the input question is output in a form representative of the requested persona.

20 Claims, 6 Drawing Sheets

(51) Int. Cl.
*G06F 16/338* (2019.01)
*G06F 16/9535* (2019.01)

(56) References Cited

U.S. PATENT DOCUMENTS

| | | |
|---|---|---|
| 8,078,698 B2 | 12/2011 | Moore |
| 8,442,940 B1 | 5/2013 | Faletti et al. |
| 2009/0287678 A1 | 11/2009 | Brown et al. |
| 2009/0299932 A1 | 12/2009 | Hodge et al. |
| 2011/0066587 A1 | 3/2011 | Ferrucci et al. |
| 2011/0125734 A1 | 5/2011 | Duboue et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2016/0132590 A1 | 5/2016 | Byron et al. |
| 2016/0171094 A1 | 6/2016 | Byron et al. |

OTHER PUBLICATIONS

Gustafson, Joakim et al., "The August spoken dialogue system", Sixth European Conference on Speech Communication and Technology, EUROSPEECH 1999, http://www.speech.kth.se/august/eur99_augsys.html, Budapest, Hungary, Sep. 5-9, 1999, 8 pages.

High, Rob, "The Era of Cognitive Systems: An Inside Look at IBM Watson and How it Works", IBM Corporation, Redbooks, Dec. 12, 2012, 16 pages.

Mccord, M.C. et al., "Deep parsing in Watson", IBM J. Res. & Dev. vol. 56 No. 3/4 Paper 3, May/Jul. 2012, pp. 3:1-3:15.

Yuan, Michael J. , "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

500

Input Question:
- What was the cause of the American Civil War? — 510

Sources to be included: — 530
- Abraham Lincoln Library Database ☒
- Civilwar.net ☐
- History.org: Civil War Forum ☐

SUBMIT

Select Persona: — 520
- Abraham Lincoln
- John Wilkes Booth
- Southern Aristocrat
- Northern Abolitionist

540 — Steve: What was the cause of the America Civil War?

550 — Abraham Lincoln: Our nation has suffered from the illness of slavery for too long. It is the God given right of all men to be free.

Steve: But what about the States' rights to determine their own laws and government?

Abraham Lincoln: Our fore fathers birthed this nation on the principle of freedom for all men under the Constitution, which cannot be subjugated by the states.

560 — CHANGE DOMAIN    CHANGE SOURCES — 570    CHANGE PERSONA — 580

ANSWERING QUESTIONS VIA A PERSONA-BASED NATURAL LANGUAGE PROCESSING (NLP) SYSTEM

This application is a continuation of application Ser. No. 14/539,268, filed Nov. 12, 2014, status awaiting publication.

BACKGROUND

The present application relates generally to an improved data processing apparatus and method and more specifically to mechanisms for answering questions via a persona-based natural language processing (NLP) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems include Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a question answering (QA) system comprising a processor and a memory comprising instructions executed by the processor, for performing persona-based question answering is provided. The method comprises receiving, by the processor, an identification of a requested persona from a user and receiving, by the processor, a natural language question input specifying an input question to be answered by the QA system. The method further comprises, responsive to receiving the requested persona, customizing, by the processor, components of the QA system to answer questions from a viewpoint of the requested persona. In addition, the method comprises generating, by the processor, an answer to the input question from the viewpoint of the requested persona based on the customization of the components of the QA system. In addition, the method comprises outputting, by the processor, the answer to the input question in a form representative of the requested persona.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5A is an example diagram illustrating a graphical user interface for receiving user input specifying a persona for use by the QA system when generating candidate answers in accordance with one illustrative embodiment;

FIG. 5B is an example diagram illustrating an output graphical user interface illustrating an answer generated by the QA system using a selected persona in accordance with one illustrative embodiment.

DETAILED DESCRIPTION

Figure 1:
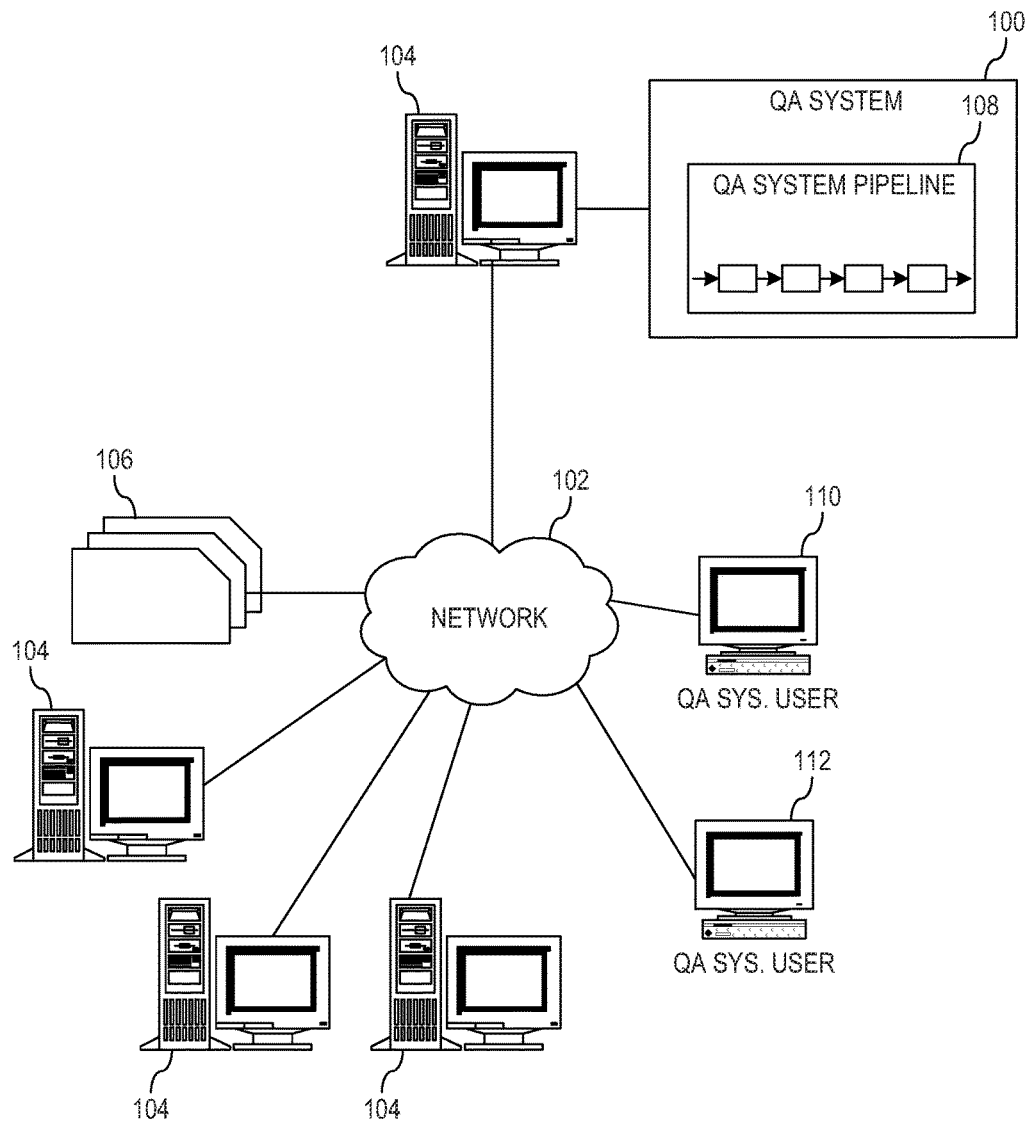
FIG. 1 is an example diagram of a distributed data processing system in which aspects of a Question and Answer system of the illustrative embodiments may be implemented.

Question and Answer (QA) systems, such as IBM's Watson™ QA system, require a significant amount of compute power to analyze a natural language question and determine the results from candidate findings. The identified candidate findings, as well as the other information from which the candidate findings are identified, may be obtained from information sources, such as media, blogs, personal experiences, books, journal and magazine articles, expert opinions, encyclopedias, web pages, or the like. Thus, the knowledge presented by the QA system in the candidate findings comes from factual evidence encoding a consensus view of the truth. While these types of candidate answers are beneficial for QA systems where the answer that is requested is based solely on a fact, there are other scenarios where a user may want the answer to be based on the viewpoint of a particular person in time, a particular person from a particular location (either in modern day or some other point in history), from a particular persona of a fictional or historical character, or the like. Such answering of questions may provide more insight into the answer by providing non-factual information as to what the particular persona perceives as the answer to the question even though another persona, or a pure factual inquiry, may generate a different answer. For example, the answer to the question "What caused the American Civil War?" may have a very different answer from the viewpoint of Abraham Lincoln that it may have from the viewpoint of a Southern aristocrat at the time of the American Civil War.

The illustrative embodiments provide mechanisms for answering questions via a persona-based natural language processing (NLP) system. A persona, as the term is used herein, refers to a specification of personality attributes or characteristics, such as age, gender, education level, socio-economic status, ethnicity, religious belief, occupation, political affiliation, etc., of a specific person, e.g., Abraham Lincoln, or a generally defined type of person, e.g., a person from eastern Europe in the 1800's. With a user-identified persona, the QA system customizes components of the QA system to answer questions based on the user-identified persona. In one embodiment, the QA system is customized by identifying content that is based solely on the requested persona, ingesting that content into a specific corpus, and identifying one or more personality attributes associated with the requested persona from the ingested corpus thereby constructing the synthetic persona backed by the ingested corpus. The identification of the content in the larger corpus or corpora so as to generate a personal specific corpus may be performed, for example, using annotations added to the content through a pre-processing or ingestion operation using one or more annotators specifically configured for annotating content for particular types of personality attributes. The persona itself may have corresponding annotations associated with it such that annotations associated with the persona may be matched to annotations associated with the content, e.g., the personality attributes may be specified as one or more annotations corresponding to the personality attributes, and thereby the portions of the corpus that correlate to the user-identified persona may be identified through matching algorithms.

These annotations associated with the persona, and used to annotate the content of the corpus or corpora, may be pre-defined annotations used by the QA system and thus, recognizable by the QA system. The annotations are indicative of the personality attributes for defining a persona and for identifying content that would be important to, known by, or otherwise available to a person having that particular persona. For example, the annotations may include a time frame annotation that specifies a time frame associated with the persona (e.g., "classical era," "1800-1900," "Great Depression," etc.), a social class annotation (e.g., "aristocrat," "middle class," "poor," etc.), an ethnicity annotation (e.g., "African American," "American Indian," "Caucasian," etc.), a gender annotation (e.g., male, female), a nationality annotation (e.g., "American," "Irish," "European," "Great Britain," "Mexican," etc.), a political affiliation annotation (e.g., "Democrat," "Republican," "Tea Party," "Communist," etc.), a particular fictional or historical character/person annotation (e.g., "Abraham Lincoln," "Alexander the Great," "Tom Sawyer," "Atticus Finch, "Hamlet," etc.), or any of a plethora of other possible annotations indicative of personality attributes that would define different types of persons in modern or historical contexts.

In another embodiment, the QA system is customized such that candidate answers identified from a corpus are weighted via a weighting structure such that candidate answers that more closely align with personality attributes associated with the requested persona are utilized while persona inappropriate candidate answers are filtered out or given relatively smaller weights. Again, annotations in the content may be compared to annotations associated with a specified persona such that matches may indicate content that is more aligned with the personality attributes of the selected persona while non-matches are indicative of content that is not closely aligned with the personality attributes of the selected persona. Differing weights may be associated with different annotations or personality attributes to facilitate identification of more/less important or prioritized annotations/personality attributes.

In still a further illustrative embodiment, various pipelines of the QA system may be established for different pre-defined personas. For example, a first pipeline may be configured to provide answers to questions from the viewpoint of a persona in ancient times, e.g., a Greek or Roman citizen from ancient times. A second pipeline may be configured to provide answers to questions from the viewpoint of a particular individual in history, e.g., Abraham Lincoln. A third pipeline may be configured to provide answers to questions from the viewpoint of a particular type of person in modern times, or any other specified time period in history, such as the viewpoint of an aristocrat, a middle class individual, a person living in poverty, a healthcare worker, a government official, or any other definable persona that may be defined by selection of the persona from a pre-determined set of personas, selection of one or more personality attributes from a pre-determined set of personality attributes, or personas/personality attributes otherwise specified in a free-form natural language manner. By customizing the QA system for a specified persona, the QA system answers questions from the perspective or viewpoint of the user-identified persona thereby simulating interaction with a person from a certain point in time/location in history, from a particular persona of a fictional or historical character, or the like. In this way a simulated or synthetic persona, or "synthetic personality," is providing answers to the questions submitted by the user and a type of simulated conversation between the user and the simulated persona is facilitated.

Current methods of persona-play, such as a person pretending that they are from a specified time, place, culture, or nationality for example, require the person to think, respond, and act as a person from another place, time, culture, or nationality. However, the person performing the persona-play may find the "act" difficult since their mind is biased with knowledge arising from their own contemporary and/or spatially located experience. In contradistinction, the QA system of the illustrative embodiments provides a synthetic personality using only that knowledge that is substantially authentic to the persona as obtained from analysis of the corpus or corpora upon which the QA system operates. That is, in one illustrative embodiment, the QA system is modified such that the answers are produced from a content specific corpus, where the evidence source is created so that only material allowed within the scope of the character's authentic access would be included, and/or candidate answers and supporting evidence for the answers are weighted, ranked, scored, and/or filtered based on desired personality attributes of the persona being portrayed. It is noted that these are only examples of how the QA system may be modified and it is recognized that there are many ways, either alone or in combination with these specifically referenced modifications, that the QA system may be modified to answer questions based on the requested persona, without departing from the spirit and scope of the invention.

In operation, with regard to one illustrative embodiment as noted above, the QA system generates a persona specific corpus from a more general or larger encompassing corpus or corpora, based on the specification of the persona. That is, when a user requests that the QA system take on a viewpoint of a specific persona, the QA system receives an identification of the requested persona from the user. This identification may be in the form of a selection from a pre-defined list of personas that are already pre-defined in the QA system, a selection of one or more pre-defined personality attributes, in a pre-defined personality attributes list, that the user desires in the persona that is to provide the answer to the user's question, a combination of selection from a pre-defined list of personas and personality attributes (and corresponding annotations), a free-form specification of a persona and/or personality attributes that the QA system then analyzes using natural language processing and determines a recognizable persona/personality attribute (and corresponding annotation) that the QA system knows and equates to the free-form specification, or the like.

The QA system then identifies and ingests information associated with the specified persona from sources, such as media, blogs, personal experiences, books, journal and magazine articles, expert opinions, encyclopedias, web pages, or the like, in the corpus or corpora. Specifically, those resources that are actually ingested by the QA system may be identified by the user specifically or may be ingested based on a set of rules for automatic selection by the QA system. For example, a user may specify a domain of interest, a particular publication or set of publications of interest, or the like, that the user wishes the QA system to utilize. In one illustrative embodiment, the user may specify the domain in a generic manner, e.g., the user wishes to utilize a corpus of text published during, or which describes, the American Civil War. In other illustrative embodiments, the corpus or corpora is searched based on the specified persona and annotations associated with the specified persona to identify similarly annotated portions of content in the corpus or corpora.

The portions of content from the corpus or corpora to be ingested by the QA system may be identified through an algorithm to match the personality attributes (and their corresponding annotations) to similar representations of the personality attributes in the content of the corpus or corpora. For example, the corpus or corpora may be pre-processed such that it is annotated with annotations corresponding to recognizable personality attributes. As one example, the authorship of a document in the corpus may be analyzed to determine attributes regarding the author, e.g., the author's nationality, gender, age, political affiliation, and the like. Other documents and sources of information may be utilized to compile additional information about the author and assist in this analysis, e.g., biographical information documents for the author, statements in other documents regarding the particular author, and the like, may be searched in the corpus or corpora and information about the author extracted from these sources of information. From this information, personality attributes may be identified and corresponding annotations and values corresponding to those annotations added to the document authored by that author, e.g., "author nationality=German", "author age=36", "author gender=male" etc. These personality attributes and corresponding annotations may be pre-defined, such as in a specification data structure or other configuration data structure, with the values of these attributes being determined based on analysis of the particular document or portion of content. For example, general personality attributes of "name", "gender", "age", "nationality", "historical time frame", "political affiliation", "religious belief", etc. may be specified in a specification data structure with the particular values of these attributes being set according to the analysis of the content.

The values associated with these annotations may be compared to similar values of similar annotations regarding the particular persona that the submitter of a question has requested so as to determine a degree of matching of the particular document with regard to the selected persona. For example, a user may specify that they wish to have their question answered using the persona of Abraham Lincoln. In such an example, if the user specified persona is Abraham Lincoln, the values for the above personality attributes may be of the type "name=Abraham Lincoln", "gender=male", "age=55", "nationality=United States of America", "historical time frame=1800's, American Civil War", "political affiliation=Whig Party, Republican", "religious belief=Christian", etc. These values may be compared to values for similar annotations in content or documents of a corpus to select documents/content to include in a persona specific corpus, for example. The particular values for these annotations may be pre-defined, such as in the case of a set of pre-defined personas from which a user may select a desired pre-defined persona, or may be dynamically set based on input from the user to select individual values for these attributes or for entering free-form terms describing the desired persona which may then be correlated to pre-defined personality attributes.

Based on a threshold degree of matching between the values of the annotations associated with the user selected persona and the values of similar annotations in the content/document of the corpus, the document may then be selected or not selected for inclusion in a persona specific corpus. In this way, a persona specific corpus is selected that comprises a sub-set of the documents in the corpus, with this sub-set being specific to the user selected persona with regard to the persona specific corpus only containing documents and content that would have been known or available to the selected persona or is about the selected persona.

These various sources, collections of sources, and the like, once ingested by the QA system, may collectively represent a different corpus within the corpora of the QA system, i.e. a persona specific corpus. Once a plurality of sources are ingested by the QA system, the QA system then applies deep natural language processing (NLP) to curate the corpus that includes but is not limited to subjective differentiation, first person report differentiation, temporal identification, belief attribution, or the like. That is, portions of content that describe opinions or views of the author of the content may be identified using keyword or key phrase identification and semantic analysis, e.g., "my opinion is . . . ", "best", "worst", and other terms/phrases indicative of a subjective determination within a statement may be used to perform subjective differentiation. Similarly, content may be analyzed to identify which content is written from a first person report viewpoint and which is not based on the words and phrases utilized therein, e.g., "I saw . . . " Other similar analysis of terms/phrases within content may be used to identify indications of temporal/spatial context of the content. In this way, portions of content within the persona specific corpus may be evaluated for weighting based on whether the content is subjective in nature, first person viewpoint, within a predefined temporal/spatial range, or the like.

Furthermore, since the illustrative embodiments may be dealing with historical personas, the QA system may apply additional NLP processing to information that requires linguistic changes. That is, sources, such as dictionaries, named entity lists, syntactic resources or the like, may require one or more adjustments to accommodate linguistic changes since the time of writing of the sources. Such modification to these resources may be based on pre-defined data structures for the particular historical context, cultural context, and the like, of the particular persona, e.g., terms that were used in the 1800 that may no longer be utilized in modern context and modern terms may not have been known during the 1800s and thus, these data structures may be utilized to filter and modify the resources used for performing NLP operations.

In addition to ingesting material for purposes of generating answers to input questions, the QA system may synthesize or build a model of personality attributes/parameters for various personas requested by the user in a manual or semi-automated fashion, through a number of techniques. These techniques may be used to construct a synthetic persona having the specified personality attributes/parameters, backed by the identified corpora that conform to the requested persona's personality attributes/parameters. That is, for more recent personas, the QA system may implement an automatic or semi-automatic process that traverses informal internet resources such as tweets, blogs, forums, or the like for statements and/or question/answer pairs that express a viewpoint or preference, sentiment, opinion, or the like, associated with the requested persona and/or persona's personality attributes/parameters in order to model the QA system's question-answering behavior. For example, documents and sources of information from Great Britain sources regarding United States artist culture, e.g., tweets, blogs, forums, etc. indicative of the opinions of persons in Great Britain regarding the artistic culture in the United States may be traversed and analyzed, using NLP techniques, to identify subjective content indicating the way in which British people view various topics of the United States artistic culture. A persona of a modern age British person with regard to the United States artistic culture may then be developed by compiling the information from the content, e.g., older British people find the United States artistic culture to be boorish and unrefined, younger British people find the United States artistic culture to be edgy, exciting, and rich.

This process may be repeated for a plurality of different subjects, domains, topics, or the like, so as to develop a larger representation of the persona of a modern age British person's views regarding the various subjects. For example, the QA system may be specifically configured for answering questions regarding art and thus, a variety of different art related subjects may be investigated to obtain the views of these art related subjects from different types of personas. However, from a single persona perspective, the views of that particular persona with regard to a variety of different art related subjects is compiled and used to build the persona. It should be appreciated that the development of views of a particular persona may be generated through a consensus analysis by compiling and analyzing a large set of statements, documents, and other content regarding a subject, from the corpora, and determining commonalities in these statements indicative of a common view of a large number of individuals contributing to the consensus and which have similar personality attributes.

The QA system may then present the collection of statements and/or question/answer pairs, and/or automatically generated persona attributes, e.g., young, British, male, artistic, etc., to the user via a user interface (UI). Based on a set of selections from the statements and/or question/answer pairs provided by the user that together represent the personality or persona the user would like to construct, the QA system may generate a set of seed statements or views of the persona that are used as a basis for searching the corpus or corpora for additional evidence that supports the statements or views. The additional evidence from the corpus or corpora may be ranked or scored, thereby ranking or scoring content in each corpus in a corpora of information as to its compatibility with the seed set.

Once the QA system has ingested information associated with the requested persona, curated the information so as to distinguish the account of the information, adjusted any information to account for linguistic changes, identified any specific personality attributes/parameters, and ranked or scored all associated information in the corpora accordingly, the QA system then implements the requested persona so as to respond to questions utilizing the requested persona. In doing so, the QA system utilizes natural language generation and summarization techniques, such as sentence fusion, to generate answers to one or more input questions in the identified persona demonstrating the appropriate sentence structure, vocabulary choice, other stylistic elements, or the like, of the persona. For example, through analysis of the persona's personality attributes, e.g., male, lived in the 1800s, aristocrat, etc., the statements made by individuals in documents of the corpus that match this set of personality attributes (and corresponding annotations) may be analyzed to determine the types of words used, sentence structure used, and other semantic and syntactic characteristics of those individuals' statements. The results of this analysis may be used to generate a model for the language used by a persona of this type. When generating an answer to an input question, the answer may be initially generated in a normal manner and then processed by applying the language model for the persona to modify the output of the answer to simulate the persona responding to the question. For example, if the persona is a person from Great Britain during the 1700s, terms such as "you" may be replaced with "thee" or "thou", or spelling of certain words may be modified to represent the spelling used in Middle English, such as the word "ordinary" may have its spelling changed to "ordynarye" or realize may be changed to "realise." If the persona is for a person from a different country using a different spoken language than that of the person submitting the question, then while the answer may be presented in the language of the person submitting the question, the answer may be modified to incorporate words, inflections, sentence structure, or the like, from the language spoken by a person matching the persona, e.g., words from the French language may be interspersed into the answer so long as they do not detract from an understanding of the answer, e.g., "Oui, le United States Presidente is very influential." Correlations of terms and phrases between nationalities, geographic regions, temporal ranges, and the like, may be specified in various data structures and resources, e.g., dictionaries, thesauruses, synonym data structures, and the like, utilized by the mechanisms of the illustrative embodiment.

Additionally, based on feedback from the users of the QA system or from manual interventions, the QA system may make adjustments, i.e. be trained, to more closely portray the requested persona. That is, if the QA system is simply responding to a question, the QA system may generate a factoid answer without a distinct persona-based sentence structure, vocabulary choice, other stylistic elements, or the like. However, if the QA system is responding in more of a conversational nature, the QA system responds utilizing natural language generation that is more distinct in the requested persona utilizing the appropriate sentence structure, vocabulary choice, other stylistic elements, or the like, that is identified from the corpus, received via feedback, manually identified, or the like. The user may then provide feedback as to whether the persona is correctly represented in the returned answer and if not, where the problems may lie. A human user may review the feedback and make adjustments to the QA system to more accurately portray the requested persona.

It should be appreciated that the above summary of one illustrative embodiment utilizes a mechanism for generating a persona-specific corpus to be used to provide answers to an input question. However, in other illustrative embodiments, the corpus or corpora as a whole may be utilized to generate candidate answers to input questions with the candidate answer's confidence scores being adjusted based on a degree of matching of the personality attributes (and corresponding annotations) of the selected persona with the personality attributes (and annotations) associated with the content that is the source of the candidate answers or provides supporting evidence for the candidate answers. Those candidate answers that are from sources, or are supported by evidence, that have personality attributes (annotations) matching those of the persona are given greater weight and thus, higher confidence scores, than those that do not. In such an embodiment, the resulting candidate answers, and final answer, may also be reformulated to match the language characteristics of the selected persona in the manner discussed above.

Thus, with the mechanisms of the illustrative embodiments, a QA system is augmented to provide answers to questions from a viewpoint of a selected persona by identifying persona personality attributes (and corresponding annotations) and correlating these with similar personality attributes (and annotations) in portion of contents (e.g., documents) of a corpus. In this way, a persona specific corpus is generated that represents the information available to, the subjective views of, and language utilization of, the particular persona. This personal specific corpus may then be utilized by the QA system to answer an input question from the view of the selected persona. The answer returned may then be reformulated to match the language characteristics of the persona.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to analyzing natural language questions to determine missing information in order to improve accuracy of answers.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of content links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of personas, type of information, tasks, or the like, associated with the question, in each document of a corpus of data may allow the QA system to more quickly and efficiently identify documents containing content related to a specific query and a specific persona selected by a user for answering the question. As such, the content creator may add annotations and other metadata to the content to specify the characteristics of the content being provided in the document, e.g., the content is authored or contains statements from Abraham Lincoln or the author is an $18^{th}$ century Franciscan monk, or the like.

The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify this question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of data 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The content creator may further annotate or otherwise provide metadata for the content in the document to assist with persona based answer generation by the QA system 100 in accordance with the illustrative embodiments. In addition, or alternatively, mechanisms of the QA system 100, e.g., annotators, may operate on the content in the document when ingesting the corpus 106 or otherwise pre-processing the corpus 106, to thereby annotate the portions of content and documents within the corpus 106 with regard to personality attributes of personas of interest, as will be described in greater detail hereafter. It should be appreciated that the document created by the content creator may include any file, text, article, or source of data for use in the QA system 100. This data may represent structure and/or unstructured text and may be operated on by the Natural Language Processing (NLP) mechanisms of the QA system 100.

QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers which may be returned to the user and/or from which a final answer is selected and returned to the user. The ranking of the candidate answers may be performed in accordance with confidence scores calculated for the candidate answers based on evaluation of the sources of the candidate answers and supporting evidence in the corpus 106 for the candidate answer being a correct answer for the input question. In accordance with mechanisms of the illustrative embodiments, the candidate answers may be further generated based on a selected persona specified by the user when submitting the input question, either through generation of a persona specific corpus from the corpus 106, weighting candidate answers based on a correspondence between the source of the candidate answers and personality attributes of the selected persona, or a combination of these approaches.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 4.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular knowledge domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM® Corporation website, IBM Redbooks®, and the like. For example, information about the Watson™ QA system can be found in Yuan et al., "Watson and Healthcare," IBM developerWorks®, 2011 and "The Era of Cognitive Systems: An Inside Look at IBM Watson and How it Works" by Rob High, IBM Redbooks®, 2012.

Figure 2:
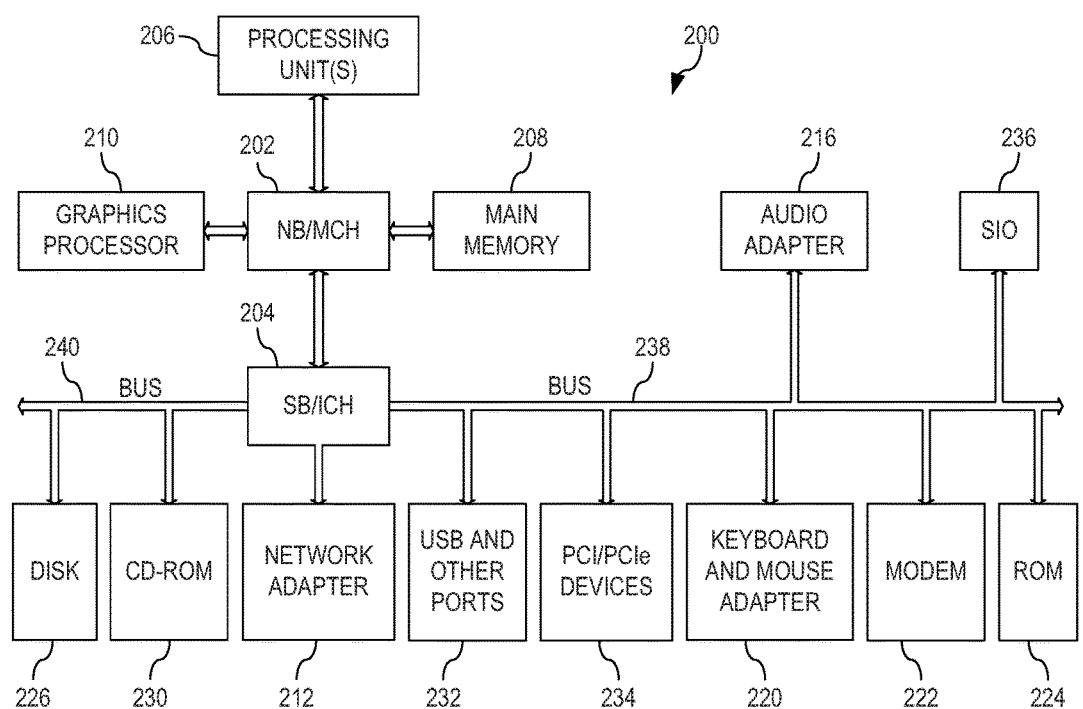
FIG. 2 is an example block diagram of a computing device in which aspects of the illustrative embodiments may be implemented.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
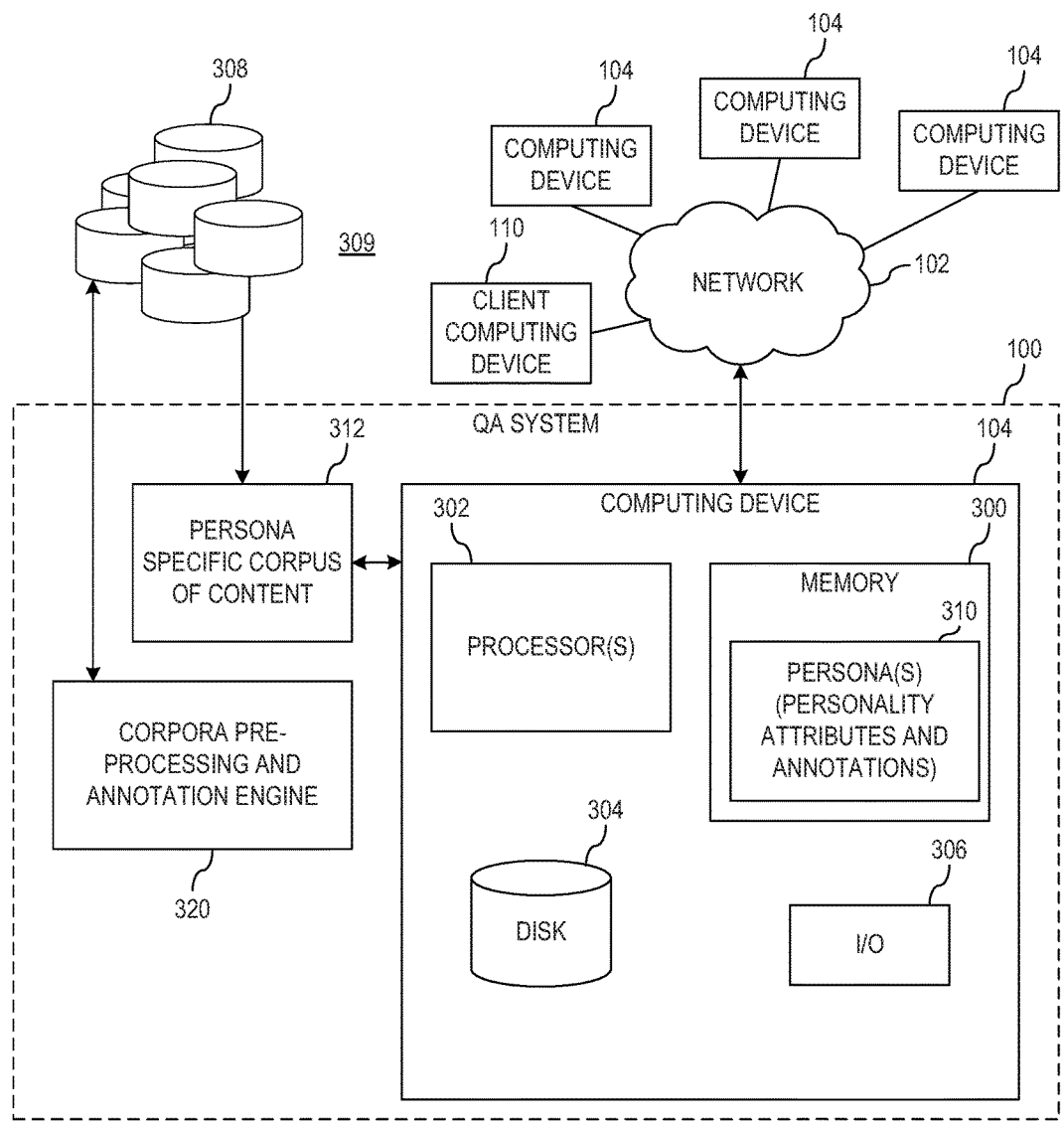
FIG. 3 depicts a schematic diagram of one embodiment of the QA system 100 of FIG. 1 in accordance with an illustrative embodiment.

FIG. 3 depicts a schematic diagram of one embodiment of the QA system 100 of FIG. 1 in accordance with an illustrative embodiment. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 300 and executed by a processing device, such as processor 302. The QA system 100 may include other components, such as a disk storage drive 304, and input/output devices 306, and at least one corpus 308 within a corpora or knowledge domain 309. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein and may be augmented or configured to implement the additional operations, functionality, and features described hereafter with regard to the illustrative embodiments described in conjunction with the subsequent figures.

In one embodiment, the QA system 100 includes at least one computing device 104 with a processor 302 for performing the operations described herein in conjunction with the QA system 100. The processor 302 may include a single processing device or multiple processing devices. The processor 302 may have multiple processing devices in different computing devices 104 over a network such that the operations described herein may be performed by one or more computing devices 104. The processor 302 is connected to and in communication with the memory device. In some embodiments, the processor 302 may store and access data on the memory device 300 for performing the operations described herein. The processor 302 may also be connected to a storage disk 304, which may be used for data storage, for example, for storing data from the memory device 300, data used in the operations performed by the processor 302, and software for performing the operations described herein.

In one embodiment, the QA system 100 is initialized with regard to a requested persona. In accordance with an illustrative embodiment, processor 302 receives an identification of the requested persona from a user. The identification of the requested persona may be obtained by presenting, by the QA system 100, to the user of a client computing device 110 via network 102, a graphical user interface (GUI) or other interface through which the user may either select a pre-defined persona, select one or more personality attributes (and thus, their corresponding annotations) from a pre-defined listing of personality attributes, enter a textual description of the persona via one or more free-form (natural language) text entry fields, any combination of the above, or the like. For example, the GUI presented by the QA system 100 to the client computing device 110 may comprise a pre-defined listing of personas grouped by type such that a user may first select a type of persona that they are interested in and then may select a particular persona from a listing of personas having that type.

As one example, the personas may be grouped into fictional characters, historical persons, and general personas. Under fictional characters, a listing of fictional characters including Spiderman, Frodo Baggins, Atticus Finch, Indiana Jones, and the like may be presented and may represent personas of fictional characters that may be selected by the user. Under historical persons, personas for Abraham Lincoln, John F. Kennedy, Plato, Socrates, Martin Luther, St. Francis of Assisi, and the like may be presented for selection. Under generic personas, various personas of a generic nature including $18^{th}$ century aristocrat, early 1900s steel worker, French impressionist artist, and the like may be provided for selection. Of course, many levels of possible groupings of personas may be presented with the groupings becoming more and more specific as one drills down within a particular grouping. Each person will have its own pre-defined set of personality attributes associated with it and thus, corresponding annotations that may be used for matching purposes. Alternatively, or in addition, if the user has selected to enter free-form textual descriptions of the persona, this text may be processed using natural language processing techniques to extract keywords and phrases that are recognizable and which may be equated to known personality attributes either directly, through synonym analysis, or other textual analysis that correlates terms, phrases, and the like to particular concepts of personality attributes.

Returning to FIG. 3, processor(s) 302 parse the requested persona and executes a process utilizing natural language processing (NLP) to identify one or more pieces of content, on other ones of computing devices 104 via network 102, network attached storage systems, or the like, that together represent a corpus 308 or a corpora 309, based on the requested persona. That is, processor 302 identifies and ingests content associated with the specified persona from sources, such as media, blogs, personal experiences, electronically represented publications such as books, journal and magazine articles, expert opinions, encyclopedias, web pages, or any other electronically represented text and/or textual data. The content that is selected for ingestion may represent a persona specific corpus of content 312 which is a subset of the corpus 308 or corpora 309 that is determined to be of specific relevance to the selected persona. Which content is actually ingested by processor 302 as persona specific corpus 312 may be identified by the user through a designation of the sources of content from the corpus 308 or corpora 309 that the user wishes to utilize, based on a set of rules for automatic selection by the QA system 100, or a combination of user designation and automatic selection. The set of rules may, for example, identify a subculture, profession, or the like from which the content should be ingested. For example, blogs by urban youth from Chinese cities, journals written by presidential candidates while on the campaign trail, or, if a particular literary character is chosen, only literary works with stories that include that character would be included.

The selection of the particular content to be ingested as persona specific corpus 312, in some illustrative embodiments, may be performing using annotations already present in the corpus 308 or corpora 309 in association with the content. That is, the QA system 100 may implement a corpora pre-processing and annotation engine 320 which may operate on the corpus 308 or corpora 309 to pre-process the content and identify elements of the content indicative of personality attributes that may be used with personas. For example, information about authors of content, information about individuals described in, quoted by, or otherwise referenced in content may be identified in the corpus 308 or corpora 309 and used to correlate with a pre-defined set of personality attributes and personas. As one example, if the QA system 100 has a pre-established listing of personas 310 including "Abraham Lincoln", then the corpus 308 or corpora 309 may be pre-processed to identify documents that were written by, that describe, that reference, or that quote statements by, Abraham Lincoln and these documents, or portions of content within the documents, may be annotated with a persona or personality attribute annotation of the type "historical person: Abraham Lincoln".

It should be appreciated that in some instances, additional resources may need to be employed to determine the annotations to be applied to the content in the corpus 308 or corpora 309. For example, biographical resources may be needed to identify facts about particular persons that are authors of, quoted by, or otherwise referenced in content of the corpus 308 or corpora 309. Thus, for example, if a document in the corpus 308 is authored by Edgar Allen Poe, a biographical resource may be used to identify Edgar Allen Poe's nationality, historical time period in which he lived, geographical region in which he lived and traveled, etc. This information may be used to identify additional annotations to be included including nationality annotations, spatial and temporal annotations, and the like. Thus, an annotated corpus 308 or corpora 309 is generated with annotations corresponding to personas and/or personality attributes through the operation of the corpora pre-processing and annotation engine 320.

These annotations in the corpus 308 or corpora 309 may be used to match similar annotations present in the selected listing of personality attributes and/or associated with a selected persona retrieved from persona(s) data structure 310 in the memory 300 of the QA system 100. A degree of matching between a portion of content from the corpus 308 or corpora 309, e.g., a document, may be calculated based on the number of matching annotations, any weights assigned to these annotations based on relative importance of the annotations to other annotations, and the like. The degree of matching value calculated may then be compared to a pre-determined threshold value to determine if the portion of content is significant enough of a match with the selected persona or personality attribute to warrant inclusion in a persona specific corpus of content 312.

For example, assume that a user has selected Abraham Lincoln as a persona, indicating that the user wishes to have questions answered from the viewpoint of Abraham Lincoln. Thus, the persona for Abraham Lincoln may have a plurality of associated personality attributes and annotations associated with it including "historical person: Abraham Lincoln," "time range: 1809-1865," "nationality: United States of America," "ethnicity: caucasian," "political affiliation: Republican, Whig party", etc. The corpora pre-processing and annotation engine 320 may have already pre-processed the corpus 308 or corpora 309 and added annotations to the content to specify which documents have something to do with Abraham Lincoln, e.g., authored by Abraham Lincoln, discuss Abraham Lincoln, quote Abraham Lincoln, etc. In addition, the corpus 308 or corpora 309 may have been further annotated with other personality attribute or persona attributes including time ranges, nationality, ethnicity, political affiliations, and the like.

A search of the corpus 308 or corpora 309 for portions of content (hereafter assumed to be documents but this is for illustration purposes only and it should be appreciated that portions of content may be less than entire documents and in fact may be single sentences, terms, or phrases) having associated annotations matching those of the persona Abraham Lincoln may be performed. It should be appreciated that when it is said that the annotations "match" an exact match is not necessary, but all that is required is that predetermined criteria for considering a match to be present are met. For example, if the system is identifying matching content based on a time range annotation, all that is required is that the document in question have a publication date or describes information that would have been known to the persona during the time range of the persona, i.e. documentation that was in existence, or facts and knowledge that was in existence, while the persona was alive.

Thus, for example, with Abraham Lincoln, any documents, facts, or knowledge that was present prior to 1865, the year of Abraham Lincoln's death, would be considered a match with the annotations for Abraham Lincoln since it would be presumed that Abraham Lincoln could have had access to those documents, facts and knowledge. Hence, any documents in the corpus 308 or corpora 309 that were published prior to 1865, reference facts or knowledge that existed prior to 1865, quote individuals making statements prior to 1865, or otherwise having a relevance to the time frame prior to 1865 may be selected as a matching document from the corpus 308 or corpora 309 based on the time frame annotation. This matching may be combined with matching on other personality attributes or annotations to obtain a better understanding as to whether Abraham Lincoln is likely to have access to the document, facts, or knowledge, e.g., if the document was published in 1832 in the United States of America, then it is more likely that Abraham Lincoln would have had access to this document than if the document was published in 1864 in Germany (there is less of a time period for the document to have been translated and published in the United States before Abraham Lincoln's death in 1865).

The combination of matching personality attributes or annotations associated with the selected persona together represent the degree of matching of the document or portion of content as a whole. Different weights may be assigned to different personality attributes or annotations based on the relative importance of these annotations when identifying information relevant to persona-based answering of questions by the QA system 100. These weights may be set according to a machine learning process. Thus, for example, through machine learning, it may be determined that the time frame annotation is much more important to persona-based question answering than the political affiliation annotation and thus, the time frame annotation may be given a larger weight value than the political affiliation annotation. Moreover, the historical person annotation may be given a highest weight since if the historical person annotation is matched, it is likely that the document is of particular relevance to the corresponding persona regardless of the number of other personality attributes or annotations that are matched. The resulting calculated degree of matching based on the weighted combination of these matching personality attributes and annotations may be compared to a threshold value to determine if the document should be included in the persona specific corpus of content 312. If this threshold value is met or exceeded, then the document is included in the persona specific corpus of content 312; otherwise it is excluded.

Processor 302 then downloads and stores the matching documents or portions of content into the persona specific corpus 312 upon which it will operate. Thus, corpus 312 represents a sub-corpus, from a larger corpus 308 or corpora 309 of data or content, which contains electronic content related to a specific persona. The corpus 308 or corpora 309 of data may include any number of documents or portions of content and may be stored in any location relative to the QA system 100, however the persona specific corpus of content 312 is stored in close association with the QA system 100, and may in fact be stored in the QA system 100 as shown, through the ingestion process.

Once content is ingested as persona-specific corpus 312, processor 302 begins a process whereby components of QA system 100 are customized to answer questions based on the user-identified persona. That is, logic of the QA system 100 is configured for using persona relevant natural language processing resources, e.g., dictionaries, synonym resources, and the like, that are relevant to the particular persona, configuring logic for generating candidate answers, calculating confidence scores, and the like, based on persona-based criteria, and the like, e.g., weights assigned during scoring may be adjusted for the particular personality attributes and annotations corresponding to the persona, thereby representing the viewpoint of the persona as opposed to a more generic QA system operation.

The QA system 100 is then ready to process the input question from the viewpoint of a selected persona. It should be appreciated that, during a session, until the user selects a different persona or selects an option to discontinue persona-based question answering, the current and subsequent input questions may be answered from the viewpoint of the selected persona. In this way, a conversation aspect is provided to the operation of the QA system 100 where the user perceives that the user is submitting questions to the selected persona and receiving answers back from that persona.

In the description of the illustrative embodiment shown in FIG. 3 above, the QA system 100 is modified such that the answers are produced from the persona specific corpus 312, where the evidence sources are created so that only material allowed within the scope of the selected persona's authentic access and knowledge is included. With this illustrative embodiment, the persona specific corpus 312 represents the sub-corpus representative of the knowledge, views, and insights available to or about the particular persona.

However, as noted above, other illustrative embodiments may not utilize this persona-specific corpus 312 to achieve the operations of providing persona-based question answering. That is, in accordance with other illustrative embodiments, rather than having to construct a persona-specific corpus 312 from the more general corpus 308 or corpora 309, the QA system 100 may have its logic modified to provide preference or priority to content relevant to the particular selected persona. That is, annotators, natural language processing logic, weight values, confidence score calculation logic, and the like, may be specifically configured to provide preference or priority to features of input questions and/or portions of content that provide candidate answers or support candidate answers, that match personality attributes and annotations of a selected persona. That is, in such an illustrative embodiment, the QA system 100 is modified such that candidate answers and supporting evidence for the answers are weighted, ranked, scored, and/or filtered based on desired personality attributes of the persona being portrayed.

In this alternative illustrative embodiment, in order for QA system 100 to present the requested persona, the processor 302 must implement a process whereby the QA system 100 has a knowledge level of the selected persona based on a location and/or point in time in history (i.e. QA system 100 portraying the role of Christopher Columbus would not know about steam engines but would know about knots), socioeconomic status of the persona, ethnicity of the persona, political leanings of the persona, etc. The processor 302 implements a process whereby QA system 100 has the 'personality' of the persona, as represented by the personality attributes and annotations of the persona, that may not always be based on a particular person but rather on a more generic set of demographic information (e.g., offshore call center employee, Norwegian immigrant to the Midwest of the United States in 1920, etc.). Thus, processor 302 may implement the knowledge level of the requested persona by prioritizing or giving preference to content in the corpus 308 or corpora 309 that are relevant to the particular personality attributes and annotations corresponding to the selected persona.

In either illustrative embodiment, it should be appreciated that the corpus 308 or corpora 309, or the persona-specific corpus 312, may be curated such that the processor 302 applies deep NLP including, but not limited to, subjective differentiation, first person report differentiation, temporal identification, belief attribution, or the like, to differentiate the types of documents present in the corpus. In accordance with the illustrative embodiments, subjective differentiation comprises differentiating subjective from objective statements in a document. First person report differentiation comprises differentiating first-person reports, for example the first-person perspective on an event as described in a personal letter, versus secondary sources, for example, from news reports. Temporal identification comprises calculating the time/place when a reported event happened, in order to judge whether its existence is within the circumscribed knowledge or historical event horizon that bounds the user identified persona. Finally, belief attribution comprises differentiating the beliefs/opinions held by a particular character in a work from those expressed by other characters, or a third-person narrator. Each of these differentiations may be made based on the identification of key terms/phrases indicative of the corresponding differentiating condition, e.g., first person accounts may utilize terms such as "I" and "me", temporal identification may be performed using date/time references in the text or references to other historical events that are contemporaneous to the statements in the document, belief attribution may be identified by terms such as "I believe", "it is my opinion", "in his address, Lincoln said", etc. Such curating may be done so as to adjust weights associated with scoring of the corresponding content or inclusion/exclusion of the content from consideration for use in the representation of the persona-based answer. For example, first person accounts may be given greater weight than third person accounts. Statements that are within the temporal range of the persona are given higher weight than statements made in a temporal period outside the range of the persona. Statements of belief attributed to the particular persona may be given greater weight than statements of belief of other individuals.

As discussed above, the user selection of a persona or personality attributes (and their associated annotations) may be used by the processor 302 to synthesize or build a model of a persona in an semi-automated or automated fashion in order to construct a wholly synthetic persona, backed by the ingested corpora 309 that conform to the requested persona. In a semi-automated implementation, processor 302 may traverse formalized or informal internet resources such as tweets, blogs, forums, or the like for statements and/or question/answer pairs that express a viewpoint or preference, sentiment, opinion, or the like, associated with the requested persona in order to model QA system's 100 question-answering behavior. Processor 302 may then present the collection of statements and/or question/answer pairs to the user via a graphical user interface (GUI). Based on a set of selections from the statements and/or question/answer pairs provided by the user that together represent the personality the user would like to construct, processor 302 ranks or scores the ingested information in corpora 309 using the set of selections from the statements and/or question/answer pairs as seeds, thereby ranking or scoring each corpus in a corpora of information as to its compatibility with the seed set.

Once processor 302 has ingested information associated with the requested persona, curated the information so as to distinguish the account of the information, adjusted any information to account for linguistic changes using various semantic and syntactic resources, identified any specific personality attributes and annotations, and ranked or scored all associated information in corpora 309 accordingly, processor 302 may store the personality attributes and annotations associated with the requested persona in the persona data structure 310 in memory 300 if it is not already present in the persona data structure 310, e.g., not selected from pre-defined personas in the persona data structure 310. Processor 302 and QA system 100 may then implement the requested persona so as to respond to questions utilizing the requested persona. Questions are analyzed and processed in accordance with the QA system logic, as described hereafter with regard to FIG. 4, to analyze the question, generate queries, apply queries to the corpus 308, corpora 309, or a persona-specific corpus 312 depending upon the particular embodiment, and generate candidate answers and score these candidate answers, and generate a final answer from the scored candidate answers. In so doing, the generation of candidate answers and scoring of the candidate answers takes into consideration the specified persona provided with the input question. This may be taken into account through the matching of personality attributes/annotations of the persona with attributes/annotations in the documents of the corpus, through weights assigned to scores generated for the particular documents based on the correlation of attributes/ annotations in the documents, and the like. This may further be taking into account through the generation of the person-specific corpus 312 in certain illustrative embodiments.

The processor 302 may generated the candidate answers and reformulate the answers so that they exhibit the communication style or personality attributes of the person through natural language generation techniques based on language usage attributes of persons similar to the selected persona, and in some instances by finding and processing enough primary sources of exact quotes or recorded speech of the character. In doing so, processor 302 utilizes natural language generation and summarization techniques, such as sentence fusion, to generate answers to one or more input questions in the identified persona demonstrating the appropriate sentence structure, vocabulary choice, other stylistic elements, or the like, of the persona. Additionally, based on feedback from the users of the QA system or from manual interventions, QA system 100 may make adjustments, i.e. be trained, to more closely portray the requested persona's speech or writing style. That is, if QA system 100 is simply responding to a question, QA system 100 may generate a factoid answer without a distinct persona-based sentence structure, vocabulary choice, other stylistic elements, or the like. However, if QA system 100 is responding in a more conversational in nature, QA system 100 responds utilizing natural language generation that is more distinct in the requested persona utilizing the appropriate sentence structure, vocabulary choice, other stylistic elements, or the like, that is identified from the corpus, received via feedback, manually identified, or the like.

Thus, the mechanisms of the illustrative embodiments provide the ability to define personas which in turn define the viewpoint from which a question is answered. In this way, a user may be given an experience of having a conversation with the selected persona, and may be provided insight into the viewpoints of different persons with regard to the same or similar questions.

To illustrate the operation of the invention further, consider the following example in which an illustrative embodiment of the present invention is implemented. Assume that a user wishes to ask the question "What caused the American Civil War?" but wishes to have the answer come from the viewpoint of Abraham Lincoln. The user may log onto or otherwise access the QA system which may present to the user a GUI through which the user may specify the persona that they are interested in and enter the question that they wish to have answered. In this example, it is assumed that the implementation allows users to select from a predefined set of personas of historical persons (Abraham Lincoln, John Wilkes Booth, etc.) or a predefined set of generic persons in history (e.g., aristocrat in the 1800s). In this case, the user would select Abraham Lincoln from a listing in the GUI and enter into a field the question "What caused the American Civil War?"

In response to the submission of this selected persona and input of the question, the QA system may retrieve the personality attributes/annotations associated with Abraham Lincoln and use those annotations to search the corpus 308 or corpora 309 for the documents that have a significant enough degree of matching to the personality attributes/ annotations of Abraham Lincoln, such as by way of matching annotations between the persona and the documents, for example. The resulting significantly matching documents may be compiled into a persona-specific corpus for Abraham Lincoln. In addition, the logic of the QA system may be adjusted to take into account the personality attributes/ annotations of Abraham Lincoln, such as by way of modifying weights and scoring logic to more accurately reflect the persona of Abraham Lincoln, e.g., weighting more highly documents written by Abraham Lincoln, weighting more highly documents that are within the time frame of Abraham Lincoln, etc. Moreover, natural language processing resources, such as dictionaries, named entity lists, synonyms, language structure resources, and the like, may be adjusted to reflect the era of the persona, e.g., 1800s United States of America. As such, more modern concepts, terminologies, and the like may be eliminated from consideration when performing natural language processing and/or scoring of candidate answers.

Through this process, the QA system is configured to operate as the persona of Abraham Lincoln by limiting itself to the knowledge available to Abraham Lincoln (through corpus evaluation based on the persona) and adjusting the logic employed and language employed to thereby represent Abraham Lincoln's thinking process and communication style. Thus, the QA system operates as a synthetic persona of Abraham Lincoln.

Having been so configured, the QA system may then operate on the input question to determine how Abraham Lincoln may have responded to this question. The QA system will operate in much the same manner as it usually does, but having been configured to perform such operations from the viewpoint of Abraham Lincoln. Thus, candidate answers are generated, scored, ranked, merged, and then a final answer is selected and output. The final answer is reformulated from a factual response to a conversational response as if the persona were responding to the input question. This reformulation takes into account the known speech and writing style of the persona as determined from information and actual text and speech generated by Abraham Lincoln himself.

For example, it is known through recordings of the text of Abraham Lincoln's speeches, as well as text generated by Abraham Lincoln himself, that he tended to use inclusive language, tended to use metaphors, often referenced other well known texts including religious texts such as the Christian Bible, etc. Thus, for example, the QA system may generate answers of the type "slavery", "economic differences between northern states and southern states," and "states rights versus federal preemption", with the top ranked answer being "slavery." However, rather than merely responding "slavery", the QA system implementing the persona of Abraham Lincoln may reformulate the answer, taking into account the nature of the answer, i.e. slavery meaning that one person is indentured to another beyond their will and without compensation and synonyms being "not free", as well as the communication style of Abraham Lincoln, to present an answer of the type "Our nation has suffered from the illness of slavery for too long. It is the God given right of all men to be free."

Thus, the user is given the answer to the question from the viewpoint of Abraham Lincoln, i.e. slavery being the answer, but is given the answer in a style that comports with what is known of the persona selected by the user, i.e. the communication style of Abraham Lincoln. The answer and style would be different for a different persona, such as a Southern Aristocrat whose answer may be that "The Union imposes unfair tariffs on the Southern States and imposes its federalism taking away our State rights." The user may explore the same question from different viewpoints and thereby get a more complete understanding of the answer to the question as well as insight into the reasoning behind the answers generated.

As touched upon above, there may be many different personas that a user may construct from personality attributes/annotations, or that may be pre-established in the QA system. As such, there may be multiple QA system pipelines, i.e. organized stages of logic that operate on an input question, that are configured for different personas. This is especially true in embodiments where the QA system is pre-configured to provide a limited number of possible personas for a particular domain of interest. For example, continuing with the Abraham Lincoln example above, the QA system may be pre-configured with a first QA system pipeline trained and configured to respond from the viewpoint, and using the persona of, Abraham Lincoln. A second QA system pipeline may be pre-configured and trained to respond from the viewpoint of John Wilkes Booth. A third QA system pipeline may be pre-configured and trained to respond from the viewpoint of a southern aristocrat. A fourth QA system pipeline may be preconfigured and trained to respond from the viewpoint of a northern abolitionist. A fifth QA system pipeline may be preconfigured and trained to respond from the viewpoint of a European in the 1800s. Thus, multiple pipelines may be established and corresponding personas may be presented to a user for selection of a persona from which they would like to obtain answers to questions. As such, the QA system, in response to the user's selection of a persona, may direct the input question to a corresponding QA system pipeline. Of course, it is not necessary that the QA system pipelines be pre-configured and established before the user submits their input question and selection of a persona. A separate QA system pipeline for the particular persona selected by the user may be dynamically generated as well, depending upon the particular implementation.

Figure 4:
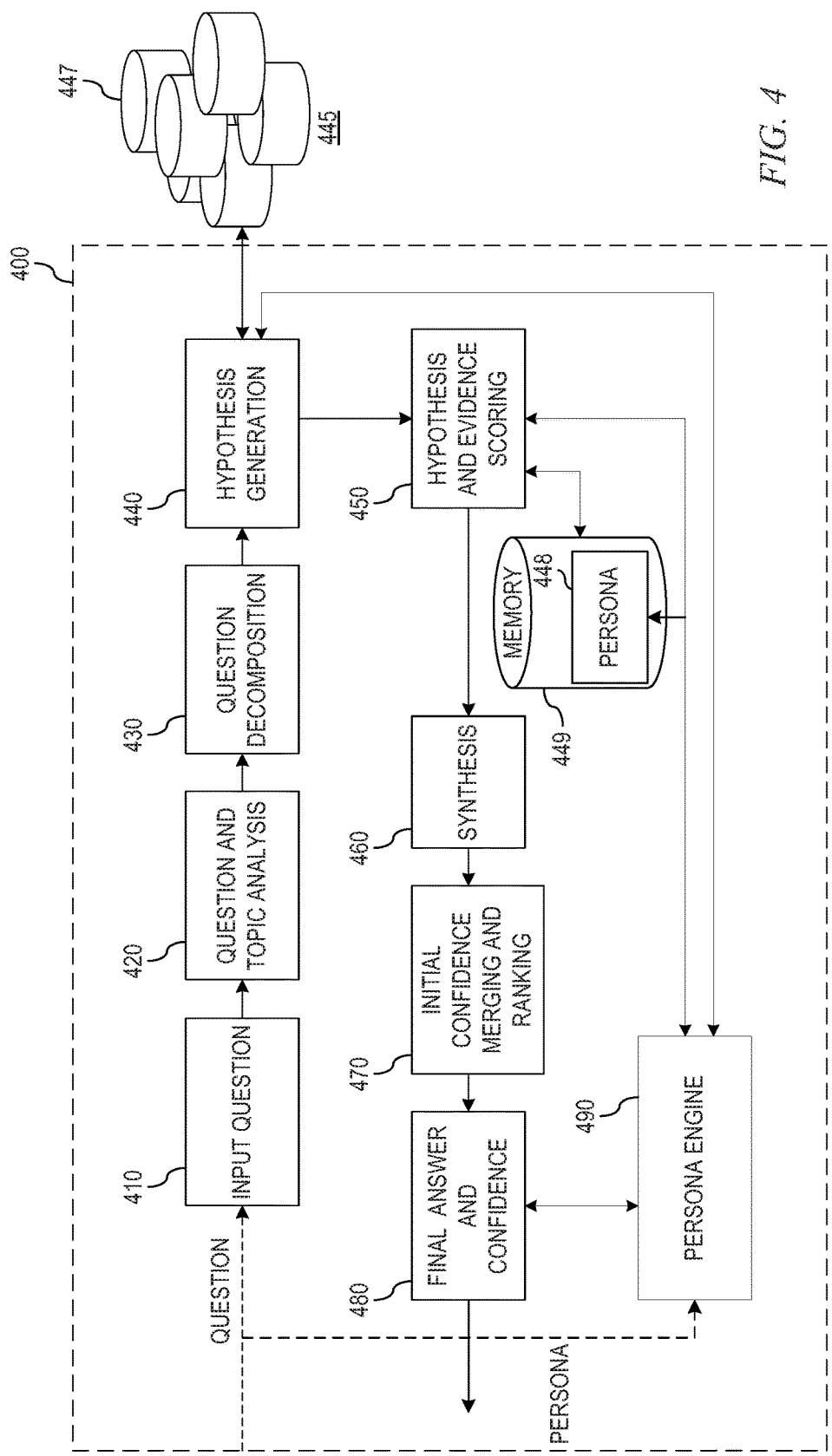
FIG. 4 illustrates a QA system pipeline for processing an input question in accordance with one illustrative embodiment.

FIG. 4 illustrates a QA system pipeline for processing an input question in accordance with one illustrative embodiment. The QA system pipeline will be described in general first to illustrate the general operation of a QA system pipeline followed by a discussion of how the QA system pipeline is augmented to implement the additional mechanisms of the illustrative embodiments.

The QA system pipeline of FIG. 4 may be implemented, for example, as QA system pipeline 108 of QA system 100 in FIG. 1. It should be appreciated that the stages of the QA system pipeline shown in FIG. 4 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 4 may be augmented, for example, in one or more of the stages to implement the improved mechanism of the illustrative embodiments described hereafter, additional stages may be provided to implement the improved mechanism, or separate logic from the pipeline 400 may be provided for interfacing with the pipeline 400 and implementing the improved functionality and operations of the illustrative embodiments.

As shown in FIG. 4, the QA system pipeline 400 comprises a plurality of stages 410-490 through which the QA system operates to analyze an input question and generate a response. In an initial question input stage 410, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 400, i.e. the question and topic analysis stage 420, parses the input question, using natural language processing (NLP) techniques, for semantic keywords identifying or more predicates, one or more arguments associated with the one or more predicates, and a set of temporal characteristics from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 430 to decompose the question into one or more queries that may be applied to the corpora of data/information 445 in order to generate one or more hypotheses. The queries may be generated in any known or later developed query language, such as the Structure Query Language (SQL), or the like. The queries may be applied to one or more knowledge domains or databases storing information about the electronic texts, documents, articles, websites, and the like, that make up the corpora of data/information 445. That is, these various sources themselves, collections of sources, and the like, may represent different corpus 447 within the corpora 445. There may be different corpus 447 defined for different collections of documents based on various criteria depending upon the particular implementation. For example, different corpora may be established for different topics, subject matter categories, sources of information, or the like. As one example, a first corpus may be associated with presidential candidates while a second corpus may be associated with Genghis Khan. Alternatively, one corpus may be documents residing in the Library of Congress while another corpus may be documents residing in the New York Public Library, Oxford Public Library, or the like. Furthermore, another corpus may be documents retrieved from informal interne resources such as tweets, blogs, forums, or the like. Any collection of content having some similar attribute may be considered to be a corpus 447 within the corpora 445.

The queries may be applied to one or more databases storing information about the electronic texts, documents, articles, websites, and the like, that make up the corpus of data/information 447, e.g., the corpus of data 106 in FIG. 1. The queries being applied to the corpus of data/information 447 at the hypothesis generation stage 440 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 440, to generate hypotheses for answering the input question. These hypotheses are also referred to herein as "candidate answers" for the input question. For any input question, at this stage 440, there may be hundreds of hypotheses or candidate answers generated that may need to be evaluated.

The QA system pipeline 400, in stage 450, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Additionally, the hypothesis generation stage 440 utilizes the parameters of persona 448 in memory 449 to provide added weight to the particular data in view of the particular persona that is to be reflected in the answers. Further, hypothesis and evidence scoring stage 450 also determines whether there is missing information and or ambiguous information that would increase the scoring of each candidate answer. That is, if a given candidate answer meets one or more of the annotators associated with the received question but has an additional annotator that is not identifiable or is unclear in the corpus of data/information 445, then hypothesis and evidence scoring stage 450 associates this missing or ambiguous information with the given candidate answer. Each reasoning algorithm in hypothesis and evidence scoring stage 450 generates a score based on the analysis it performs which indicates a measure of relevance of the individual portions of the corpus of data/information extracted by application of the queries, a measure of the missing or ambiguous information, as well as a measure of the correctness of the corresponding hypothesis, i.e. a measure of confidence in the hypothesis.

In the synthesis stage 460, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by an initial confidence merging and ranking stage 470 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate an initial ranked listing of hypotheses/candidate answers (hereafter simply referred to as "initial candidate answers").

At stage 480, a final answer and confidence score, or final set of candidate answers and confidence scores, may be generated using the final weights and output to the submitter of the original input question. The set of candidate answers is output via a user interface generated using the mechanisms of the illustrative embodiment, which provide the user with the tools for collaborating with the QA system to review, evaluate, and modify the listing of candidate answers and the evidence associated with these candidate answers that is evaluated by the QA system. The tools provided via the user interface may provide audio and video input and output. As shown in FIG. 4, in accordance with the illustrative embodiments, after stage 480, or as part of stage 480, the set of candidate answers is output via the user interface generated using the mechanisms of the illustrative embodiment, which provide the user with the tools for collaborating with the QA system to review, evaluate, and modify the listing of candidate answers and the evidence associated with these candidate answers that is evaluated by the QA system.

As shown in FIG. 4, the QA system pipeline 400 is augmented, in accordance with the illustrative embodiments, to implement a persona engine 490 that interacts with and modifies the operation of various other stages 410-480 of the QA system pipeline 400. The persona engine 490 may present to the user a GUI for receiving user inputs related to specifying one or more personality attributes (and corresponding annotations), personas, source of content to be considered in the corpus 447 or corpora 445, the input question 410, and other information for specifying the input question, the content that the user wishes to include when generating the answer, and the persona that the user wishes to receive the answer from. The persona engine 490 may receive the persona selection information and content selection information via the GUI and, based on personality attribute/annotation information in the persona data structure 448 in memory 449, and generate a persona model for use by the hypothesis generation 440 and hypothesis and evidence scoring 450 logic stages of the QA system pipeline 400 to modify the operation of the QA system pipeline 400 to be specific to the selected persona in one or more ways as already described above. For example, in one illustrative embodiment, the hypothesis generation stage 440 logic may be modified to generate a persona-specific corpus from the corpus 447 or corpora 445, upon which the hypothesis generation stage 440 logic operates to generate candidate answers. In some illustrative embodiments, the weights applied to features of content identified during scoring of the candidate answers and their supporting evidence, in the hypothesis and evidence scoring stage 450 logic, may be modified to reflect the selected persona.

As discussed above, in addition to modifying the particular corpus utilized or modifying the scoring of candidate answers based on a selected persona, the persona engine 490 may further operate in conjunction with the final answer and confidence stage 480 logic to reformulate the final answer that is generated so as to reflect the persona communication style. Thus, the final answer is output to the user in a style indicative of the selected persona giving the user the feel that the answer originates with the selected persona, e.g., Abraham Lincoln is responding to the input question.

Thus, using the mechanisms described above, or equivalent mechanisms in other QA systems generally known in the art which are augmented to include the persona mechanisms of the illustrative embodiments, a system is developed that can be used to analyze natural language questions, modify the corpus being considered, modify the scoring of candidate answers, and modify the output of a QA system to reflect the personality attributes, views, and communication style of a selected persona.

FIG. 5A is an example diagram illustrating a graphical user interface for receiving user input specifying a persona for use by the QA system when generating candidate answers in accordance with one illustrative embodiment. The example graphical user interface (GUI) in FIG. 5A is only an example and is not intended to be limiting on any aspect of the illustrative embodiments. The GUI shown in FIG. 5A is intended to be an initial GUI that the user may encounter when starting a session with the QA system and thus, may present a number of options to the user for defining the session. It should be noted that once the session is established, a more conversational GUI may be presented to the user, such as shown in FIG. 5B, so that the user is presented with an user interface that is more akin to a conversation between the user and the selected persona via a text chat or instant messaging mechanism.

As shown in FIG. 5A, the GUI 500 includes a portion 510 of the GUI where the user may enter an input question in a natural language, free-form manner. This is the input question that will be processed by the QA system using natural language processing techniques to extract key features of the input question, generate queries, apply the queries to the corpus, and generate/score candidate answers so as to return an answer to the input question.

A second portion 520 of the GUI 500 includes a selection list from which the user may select a persona that the user wishes to interact with when asking questions and having answers generated. The selection of the persona influences the types of answers provided and the way in which these answers are communicated. Thus, for example, the persona of Abraham Lincoln will give a different answer, and present the answer in a different style, than possibly the persona of John Wilkes Booth would due to their differing backgrounds, viewpoints, and the like. It should be noted that while the depicted GUI 500 utilizes pre-defined personas provided via a listing, the illustrative embodiments are not limited to such. Rather, a listing of different personality attributes may be provided and the user may be able to construct a persona by selecting one or more of these personality attributes to be included in the persona. In still another illustrative embodiment, a free-form, or natural language, text field may be provided where the user may describe the persona that the user wishes to utilize and the description may be analyzed using natural language processing to identify the personality attributes/annotations associated with the description.

A third portion 530 is provided via which the user may select certain sources of content in the corpus or corpora that the user specifically wants to include within the content considered during answer generation. This does not mean that this is necessarily the only sources of information considered, but rather that these sources will be included either exclusively or in addition to other sources of information within the corpus or corpora. Thus, in the depicted example, the user has elected to include documents from the Abraham Lincoln Library database, has selected Abraham Lincoln as the persona they wish to use, and has input the question "What was the cause of the American Civil War?" Once the user is satisfied with their selections and input in the GUI 500, the user may select the "submit" GUI element to cause the selections to be used to configure the QA system, generate a persona-specific corpus if part of the particular implementation, and submit the input question to the QA system for persona-based answer generation. The QA system may then transition to the GUI interface shown in FIG. 5B.

FIG. 5B is an example diagram illustrating an output graphical user interface illustrating an answer generated by the QA system using a selected persona in accordance with one illustrative embodiment. As shown in FIG. 5B, the GUI transitions to a more conversational interface in which questions are shown in the form of a textual message 540 from the user, in this case "Steve", while answers 550 are returned from the selected persona, in this case "Abraham Lincoln." It should be noted that the answers are formulated in the form of a conversational statement and have a communication style conforming to the communication style of the selected persona. The user may continue to submit follow-up questions via this GUI in a more conversational manner and have these additional questions processed by the QA system using the previously selected persona and source options shown in FIG. 5A. Thus, the user is given the impression of having a conversation with the persona that was selected. GUI elements 570-580 are provided for going back to a GUI, such as that shown in FIG. 5A, for modifying the configuration of the QA system for the present session, e.g., changing the sources or persona used (elements 570 and 580), or even starting a new session using a different domain (element 560) and line of questioning, e.g., switching from asking questions about the American Civil War to questions about baseball in the early 1900s, for example.

Figure 6:
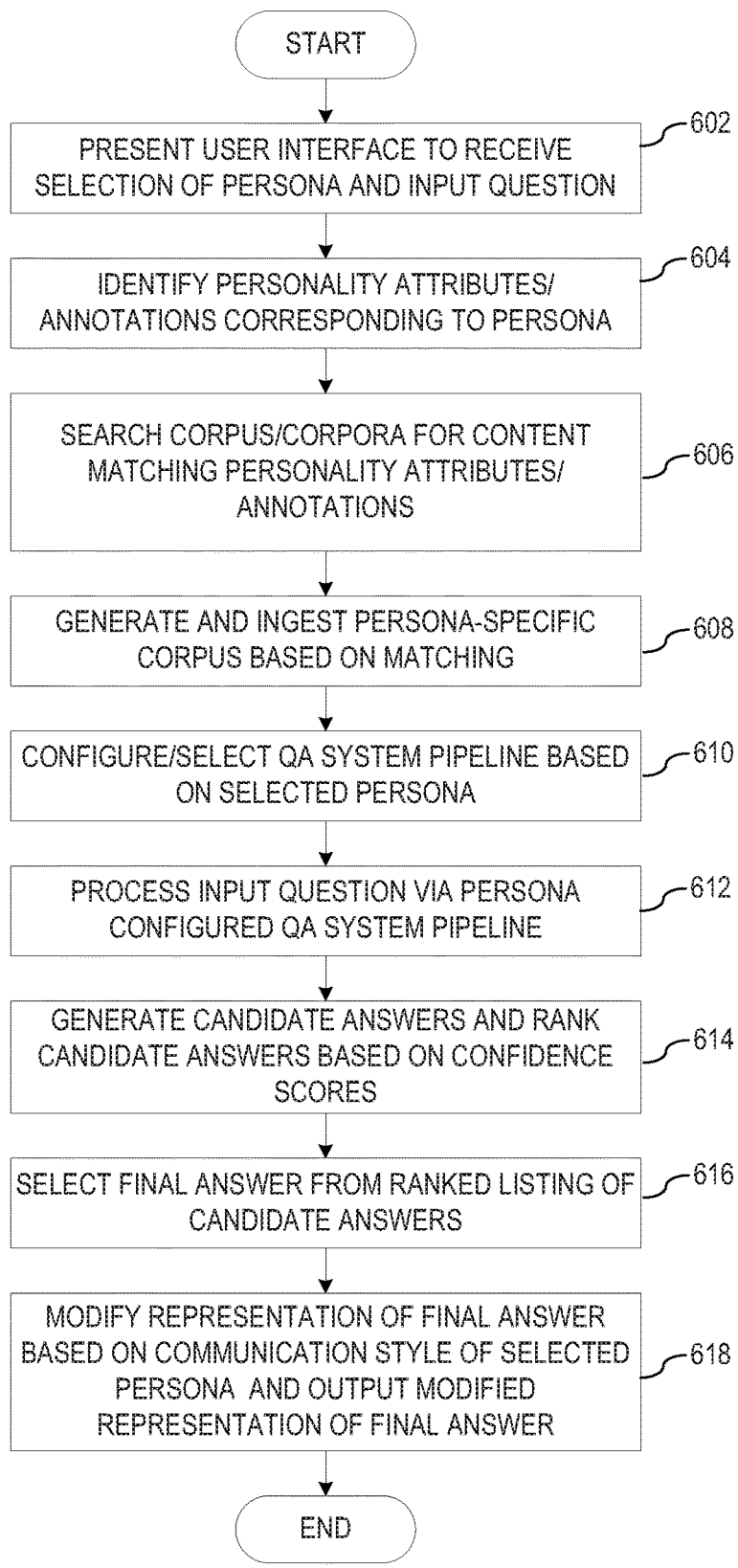
FIG. 6 depicts a flowchart outlining an example operation of a QA system employing a selected persona to perform persona-based question answering in accordance with an illustrative embodiment.

FIG. 6 depicts a flowchart outlining an example operation of a QA system employing a selected persona to perform persona-based question answering in accordance with an illustrative embodiment. The operation outlined in FIG. 6 assumes an implementation in which a persona-specific corpus is generated from a more general or larger domain encompassing corpus or corpora. However, as noted above, such is not required in the present invention and other implementations may utilize the general or larger domain encompassing corpus or corpora with only the weightings associated with scoring content from the corpus/corpora being modified based on the persona that is selected. In such a case, operations 606 and 608 may be eliminated from the depicted operation and instead the configuration/selection of the QA system pipeline in operation 610 may be used as the basis for customizing the QA system pipeline for use with a selected persona.

As shown in FIG. 6, the operation starts with, the QA system presenting a user interface to a user through which the user may select or specify a persona of interest, one or more sources of answers that the user would prefer to include for consideration, and an input question to be answered (step 602). The QA system receives, via the user interface, the user's selection of persona, optionally sources of answers to be included, and an input question for processing and identifies the personality attributes/annotations associated with the specified persona (step 604). As noted above, depending on the way in which the user has defined the persona, the identification of the personality attributes/annotations may take different forms. For example, there may be pre-established personas already defined in the QA system which have a pre-defined set of personality attributes/annotations which are simply retrieved in response to the user selecting that persona. In other instances, the user may select individual personality attributes/annotations for inclusion in the persona and thus, the user's selections are compiled into a set of personality attributes/annotations that together define the persona. In this latter case, the user may select to store this persona for later use and may give the persona a name which may then be added to the user interface in subsequent iterations of the operation of the QA system as part of the selectable personas.

Based on the identified personality attributes/annotations corresponding to the selected or specified persona, the corpus/corpora is searched for content matching the personality attributes/annotations (step 606). As noted above, in one illustrative embodiment this may involve a process of matching annotations in the content of the corpus/corpora with annotations associated with the persona, for example.

The resulting persona-specific corpus is ingested by the QA system (step 608) and the QA system pipeline is configured/selected based on the selected persona (step 610). As discussed above, in some illustrative embodiments, multiple different QA system pipelines may be pre-established in the QA system and the selection of a persona by the user may be correlated with a particular QA system pipeline that is pre-established for that selected persona. In other illustrative embodiments, a QA system may need to be configured for the particular selected persona, such as by setting weights associated with scoring, selecting semantic and syntactic resources for use by the QA system when analyzing, decomposing, and evaluating the input question against the corpus, selecting a communication style to be used in outputting the answers generated by the QA system, or the like. These configuration and selection operations are performed in step 610 so as to initialize the QA system pipeline for answering the input question from the viewpoint of the selected persona.

Once configured, the QA system pipeline may process the input question (step 612) to generate one or more candidate answers to the input question based on the persona-specific corpus. The candidate answers are then ranked based on their corresponding confidence scores, which may have been calculated using weights and values adjusted according to the personality attributes/annotations of the selected persona (step 614). A final answer is selected from the ranked listing of candidate answers, e.g., a highest ranked candidate answer may be selected as the final answer to be presented back to the user that submitted the input question (step 616).

In accordance with the illustrative embodiments, the final answer that is selected is modified so that the communication of this final answer is in a communication style corresponding to the selected persona (step 618). As discussed above, this may involve generating a profile of the persona's communication style from analysis of documents and sources of information in the corpus or corpora that were authored by the persona, descriptive of the persona's communication style, or the like. Moreover, documents that are contemporaneous with the persona may be analyzed to identify communication styles for the time period/locality of the persona so as to utilize those communication styles when a specific communication style for the persona is not readily available or the person is generic in nature rather than specifying a particular fictional or non-fictional person, e.g., if the persona is an $18^{th}$ century Russian poet, then documents authored by $18^{th}$ century Russian poets may be analyzed to generate a generic representation of their collective communication style which may then be used to apply the features of this communication style to the output of the answer by the QA system. Thus, the answer is output in the communication style of the persona selected by the user rather than as a disembodied computer system presenting factual information.

As noted above, it should be appreciated that the illustrative embodiments may take the form of an entirely hardware embodiment, an entirely software embodiment, or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a question answering (QA) system comprising a processor and a memory comprising instructions executed by the processor, for performing persona-based question answering, the method comprising:
   receiving, by the processor, an identification of a requested persona from a user;
   receiving, by the processor, a natural language question input specifying an input question to be answered by the QA system;
   responsive to receiving the requested persona, customizing, by the processor, components of the QA system to answer questions from a viewpoint of the requested persona;
   generating, by the processor, an answer to the input question from the viewpoint of the requested persona based on the customization of the components of the QA system; and
   outputting, by the processor, the answer to the input question in a form representative of the requested persona, wherein generating, by the processor, an answer to the input question from the viewpoint of the requested persona based on the customization of the components of the QA system comprises differentiating first person accounts or statements within a corpus of content from other content and providing a relatively higher rating to first person accounts or statements than other content when calculating a score for candidate answers to the input question.

2. The method of claim 1, wherein outputting the answer to the input question in a form representative of the requested persona comprises:
   synthesizing, by the processor, a synthetic persona corresponding to the requested persona; and
   implementing, by the processor, the requested persona utilizing the synthetic persona so as to utilize language content and form corresponding to the requested persona.

3. The method of claim 2, wherein synthesizing, by the processor, the synthetic persona comprises constructing a model of the requested persona based on analysis of content of one or more corpora to identify syntactic and semantic characteristics associated with the requested persona.

4. The method of claim 1, wherein customizing the components of the QA system comprises:
   ingesting, by the QA system, a persona-specific corpus, generated as a sub-corpus from one or more larger size corpora, wherein the persona-specific corpus comprises content of the one or more larger size corpora that is at least one of authored by the requested persona, contains statements attributed to the persona, descriptive of the requested persona, or descriptive of information that would have been known to the requested persona.

5. The method of claim 1, wherein receiving an identification of a requested persona from a user comprises at least one of receiving a user selection of a predefined persona, from a listing of one or more predefined personas, wherein the predefined persona comprises a set of one or more personality attributes, or receiving a user input specifying one or more personality attributes for the requested persona.

6. The method of claim 1, wherein customizing, by the processor, components of the QA system to answer questions from a viewpoint of the requested persona comprises:
   retrieving one or more personality attributes for the requested persona and one or more annotations associated with the one or more personality attributes;
   performing a search of a corpus of content based on the one or more annotations to identify portions of content having associated annotations that match at least one of the one or more annotations; and
   selecting at least a sub-set of the identified portions of content having associated annotations that match at least one of the one or more annotations as a persona-specific corpus.

7. The method of claim 6, wherein a portion of content in the identified portions of content is selected for inclusion in the at least a sub-set of the identified portions of content based on a degree of matching of annotations associated with the portion of content to the one or more annotations associated with the one or more personality attributes.

8. The method of claim 7, wherein different personality attributes in the one or more personality attributes have different associated weights, and wherein a degree of matching is calculated based on the weights associated with the different personality attributes.

9. The method of claim 1, wherein outputting, by the processor, the answer to the input question in a form representative of the requested persona comprises re-formatting the answer utilizing a language style and word choice corresponding to the requested persona.

10. A computer program product comprising a computer readable storage medium having a computer readable program stored therein, wherein the computer readable program, when executed on a computing device implementing a Question Answering (QA) system, causes the computing device to:
   receive an identification of a requested persona from a user;
   receive a natural language question input specifying an input question to be answered by the QA system;
   customize, in response to receiving the requested persona, components of the QA system to answer questions from a viewpoint of the requested persona;
   generate an answer to the input question from the viewpoint of the requested persona based on the customization of the components of the QA system; and
   output the answer to the input question in a form representative of the requested persona, wherein the computer readable program further causes the computing device to generate an answer to the input question from the viewpoint of the requested persona based on the customization of the components of the QA system at least by differentiating first person accounts or statements within a corpus of content from other content and providing a relatively higher rating to first person accounts or statements than other content when calculating a score for candidate answers to the input question.

11. The computer program product of claim 10, wherein the computer readable program further causes the computing device to output the answer to the input question in a form representative of the requested persona at least by:
   synthesizing a synthetic persona corresponding to the requested persona; and
   implementing the requested persona utilizing the synthetic persona so as to utilize language content and form corresponding to the requested persona.

12. The computer program product of claim 11, wherein the computer readable program further causes the computing device to synthesize the synthetic persona at least by constructing a model of the requested persona based on analysis of content of one or more corpora to identify syntactic and semantic characteristics associated with the requested persona.

13. The computer program product of claim 10, wherein the computer readable program further causes the computing device to customize the components of the QA system at least by:
   ingesting, by the QA system, a persona-specific corpus, generated as a sub-corpus from one or more larger size corpora, wherein the persona-specific corpus comprises content of the one or more larger size corpora that is at least one of authored by the requested persona, contains statements attributed to the persona, descriptive of the requested persona, or descriptive of information that would have been known to the requested persona.

14. The computer program product of claim 10, wherein the computer readable program further causes the computing device to receive an identification of a requested persona from a user by at least one of receiving a user selection of a predefined persona, from a listing of one or more predefined personas, wherein the predefined persona comprises a set of one or more personality attributes, or receiving a user input specifying one or more personality attributes for the requested persona.

15. The computer program product of claim 10, wherein the computer readable program further causes the computing device to customize components of the QA system to answer questions from a viewpoint of the requested persona at least by:
   retrieving one or more personality attributes for the requested persona and one or more annotations associated with the one or more personality attributes;
   performing a search of a corpus of content based on the one or more annotations to identify portions of content having associated annotations that match at least one of the one or more annotations; and
   selecting at least a sub-set of the identified portions of content having associated annotations that match at least one of the one or more annotations as a persona-specific corpus.

16. The computer program product of claim 15, wherein a portion of content in the identified portions of content is selected for inclusion in the at least a sub-set of the identified portions of content based on a degree of matching of annotations associated with the portion of content to the one or more annotations associated with the one or more personality attributes.

17. The computer program product of claim 16, wherein different personality attributes in the one or more personality attributes have different associated weights, and wherein a degree of matching is calculated based on the weights associated with the different personality attributes.

18. The computer program product of claim 10, wherein the computer readable program further causes the computing device to output the answer to the input question in a form representative of the requested persona at least by re-formatting the answer utilizing a language style and word choice corresponding to the requested persona.

19. An apparatus comprising:
   a processor; and
   a memory coupled to the processor, wherein the memory comprises instructions which, when executed by the processor, cause the processor to:
   receive an identification of a requested persona from a user;
   receive a natural language question input specifying an input question to be answered by a Question Answering (QA) system implemented by the apparatus;
   customize, in response to receiving the requested persona, components of the QA system to answer questions from a viewpoint of the requested persona;
   generate an answer to the input question from the viewpoint of the requested persona based on the customization of the components of the QA system; and
   output the answer to the input question in a form representative of the requested persona, wherein the instructions further cause the computing device to generate an answer to the input question from the viewpoint of the requested persona based on the customization of the components of the QA system at least by differentiating first person accounts or statements within a corpus of content from other content and providing a relatively higher rating to first person accounts or statements than other content when calculating a score for candidate answers to the input question.

20. The apparatus of claim 19, wherein the instructions further cause the processor to customize components of the QA system to answer questions from a viewpoint of the requested persona at least by:
   retrieving one or more personality attributes for the requested persona and one or more annotations associated with the one or more personality attributes;
   performing a search of a corpus of content based on the one or more annotations to identify portions of content having associated annotations that match at least one of the one or more annotations; and
   selecting at least a sub-set of the identified portions of content having associated annotations that match at least one of the one or more annotations as a persona-specific corpus.

* * * * *